3,816,519
BIS(HALOALKYL)PYROPHOSPHONIC ACID AMINE SALTS

Walter V. Breitigam, Wood River, and Hans Low, East Alton, Ill., assignors to Shell Oil Company, New York, N.Y.
No Drawing. Original application Nov. 18, 1968, Ser. No. 776,776. Divided and this application Mar. 31, 1971, Ser. No. 129,958
Int. Cl. C07f 9/36
U.S. Cl. 260—502.21
2 Claims

ABSTRACT OF THE DISCLOSURE

Novel pyrophosphonic and pyrophosphinic acid derivatives and their amine salts are useful as lubricating oil additives.

---

This is a division of application Ser. No. 776,776, filed Nov. 18, 1968, now U.S. Pat. 3,609,077. This invention relates to novel pyrophosphonic and pyrophosphinic acid derivatives and their amine salts and to lubricant compositions containing such compounds.

It is known in the art that while a number of compounds possess extreme-pressure (EP) properties, only a select few are suitable as additives to lubricants used in gas-turbine engines because of the severe operating conditions to which these lubricants are subjected. In this extreme environment many otherwise acceptable extreme-pressure additives have been found to be highly corrosive to metals, have contributed to the deterioration of oils, formation of deposits, loss of oxidation stability, and, in general, have caused the lubricant to fail one or more of the stringent specifications placed on lubricants of this type.

One of the most suitable extreme-pressure additives presently used in gas-turbine engine lubricants is the amine salt of monochloromethylphosphonic acid which is described in U.S. Pats. 2,777,819, 2,858,332, 2,874,120 and 2,882,228. Several other suitable extreme-pressure additives are also available, but none of these is entirely satisfactory in meeting the ever increasing requirements for these products. The development of new extreme-pressure additives which contribute to the load carrying capacity and stability of the lubricant composition while not adversely affecting its other properties would be extremely desirable.

It has now been found that certain novel pyrophosphonic and pyrophosphinic acid derivatives are beneficial in imparting extreme pressure and other properties to lubricating compositions and are especially suitable as additives to lubricants used in gas-turbine engines. It has been further found that the amine salts of these acids are particularly advantageous for imparting said properties to lubricant compositions.

The pyrophosphonic and pyrophosphinic acid derivatives according to the present invention are represented by the formula:

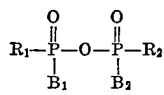

wherein $R_1$ and $R_2$ are alike or dissimilar mono- to perhalo alkyl groups having from 1 to 4 carbon atoms; and $B_1$ and $B_2$ are hydroxyl groups, $R_1$ or $R_2$ as defined above. $B_1$ and $B_2$ can be alike or dissimilar. The haloalkyl group may contain fluorine, chlorine or bromine atoms or combinations thereof. Typical haloalkyl groups include but are not restricted to the following: monochloromethyl, 1-monochloroethyl, 2-monochloroethyl, 1-monochloropropyl, 1,3-dichloropropyl, dichloromethyl, 1-chloro-2-methylpropyl, 1-chlorobutyl, 1,3-dichlorobutyl, 1-chloro-1 - methylpropyl, perchloromethyl, 1,1 - dibromoethyl, monobromomethyl, dibromomethyl, monofluoromethyl, 1,1-difluoroethyl, 1,3-difluoropropyl, difluoromethyl and the like. Haloalkyl groups having from 1 to 2 carbon atoms with at least one halogen atom substituted on the alpha carbon are preferred. Compounds wherein $R_1$ and $R_2$ are mono- or dichloromethyl groups are particularly suitable for the purposes of this invention.

Any of the above described pyrophosphonic and pyrophosphinic acid derivatives having at least one hydroxyl (OH) group can be neutralized with a primary or secondary amine to form an acid/amine salt. This class of compounds, i.e., haloalkylpyrophosphonic acid/amines and haloalkylpyrophosphinic acid/amines have been found to be especially suitable extreme-pressure additives in lubricant compositions. A particularly advantageous salt is the primary amine salt of bis(monochloromethyl)pyrophosphonic acid.

The acid derivatives of this invention can be prepared by reacting haloalkyl phosphonic or phosphinic acids with dicyclohexylcarbodiimide. The resultant product has a pyrophosphate structure and is essentially the anhydride of the reactant acid. A detailed description of the method of preparing these compounds is given in the examples. The acid/amine salts are formed by stoichiometric neutralization of the acid with a primary or secondary amine.

Amines which form effective salts according to this invention are primary and secondary alkyl amines having from 8 to 30 carbon atoms per molecule. Branched tertiary-alkyl primary amines are preferred; "branched" in this context means having at least two hydrocarbon substituents attached to the main carbon chain. As the tertiary-alkyl, the radical of polyisobutylene and polypropylene, and mixtures of these are particularly preferred. Examples of these amines are 1,1,3,3-tetramethylbutylamine, 1,1,3,3,5,5-hexamethylhexylamine, 1,1,3,3,5,5,7,7-octamethyloctylamine and 1,1,3,3,5,5,7,7,9,9-decamethyldecylamine. Tertiary alkyl methyl primary amines, such as 2,2,4,4-tetramethylpentylamine and 2,2,4,4,6,6-hexamethyl hexylamine, are also suitable.

Other primary amines which are effective in forming the salts of this invention are described in Bortnick, U.S. 2,606,923, issued Aug. 12, 1952 and Bortnick, U.S. 2,611,-782, issued Sept. 23, 1952. These include tert-tridecylamine,

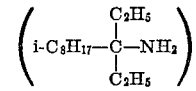

as well as isoheptyl diethyl carbinylamine, isooctylethyl propylcarbinylamine, etc. Primary amines of this type are commercially available from Rohm and Haas Company under the trade name of "Primenes." The amine may also be a polyamine, such as a diamine or triamine, and may contain other non-reactive groups, such as amide or ether groups, in the carbon chain.

Some specific examples of secondary amines suitable for making the pyrophosphonic and pyrophosphinic acid salts are diamylamine, dihexylamine, di(2-ethylhexyl)amine, dioctylamine, didecylamine, didodecylamine, ditetradecylamine, dihexadecylamine, dioctadecylamine, dibromodioctadecylamine, isopropyloleylamine, diricinoleylamine, butylricinoleylamine, butyl-2-ethylhexylamine, dilaurylamine, methyloleylamine, ethyloctylamine, isoamylhexylamine, dicyclohexylamine, dicyclopentylamine, cyclohexyloctylamine, cyclohexylbenzylamine, benzyloctylamine, benzyl-2-ethylhexylamine, allyloctylamine, dodecyl-2-ethylhexylamine, (1-isobutyl - 3 - methylbutyl)-3,3,3-methylcyclohexylamine, di(1 - isobutyl - 3 - methylbutyl)amine;

N-n-dodecyldiethylenetriamine, N-n-tetradecyldiethylenetriamine, octylethylene diamine, N-2-ethylhexyl N-hexadecyl triethylene tetramine, heptyl trimethylene diamine, N-tetradecyl tripropylene tetramine, N,N'-diallyl trimethylene diamine, 3-hexyl-morpholine, and the like.

The following examples are illustrative of the compounds of this invention and the manner of their preparation.

EXAMPLE I

Bis(monochloromethyl)pyrophosphonic acid

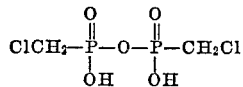

A 3-neck, 500 ml. flask equipped with a condenser, thermometer, dropping funnel, and magnetic stirring bar was charged with 200 ml. of anhydrous diethyl ether and monochloromethylphosphonic acid (26 g.; 0.2 mole). A solution of 100 ml. of diethyl ether and dicyclohexylcarbodimide (DCCD, 20.6 g.; 0.1 mole) was added slowly at room temperature. The mixture was stirred overnight at room temperature. The mixture was filtered and the solvent removed *in vacuo*. A yellow viscous oil was obtained which slowly crystallized upon standing. A yield of 90% was obtained.

EXAMPLE II

Bis(dichloromethyl)pyrophosphonic acid

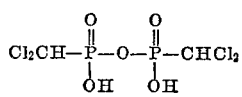

The same conditions, apparatus, and procedure used in Example I was employed in this reaction. Dichloromethylphosphonic acid (0.1 mole) and DCCD (0.05 mole) were the starting materials. A yield of 85% was obtained.

EXAMPLE III

Tetrakis(monochloromethyl)pyrophosphinate

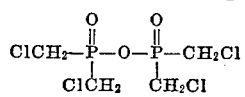

The same conditions, apparatus and procedure used in Example I involving dicyclohexylcarbodiimide (DCCD) were repeated in this reaction. Bis(chloromethyl)phosphinic acid (40.8 g.; 0.25 mole) and DCCD (15.8 g.; 0.125 mole) were the reactants. A white solid was obtained in 89% yield.

EXAMPLE IV

Tris(monochloromethyl)pyrophosphinic acid

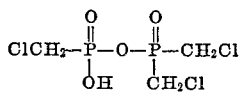

Into a 3-neck, 100 ml. flask equipped with condenser, addition funnel, and mechanical stirrer were added DCCD (20.63 g.; 0.10 mole) and 350 ml. of anhydrous dioxane (distilled from lithium aluminum hydride). Monochloromethylphosphonic acid (13.0 g.; 0.10 mole) was dissolved in 100 ml. of dioxane and added dropwise at 0° C. over a four-hour period. After stirring for an additional hour, bis(chloromethyl)phosphinic acid (16.2 g.; 0.10 mole) in 100 ml. of dioxane was added dropwise at room temperature. The mixture was filtered and the solvent removed by distillation. The urea was recovered in 95% of theory. The product was obtained in 85% yield.

The acid-amine salts of the following examples were prepared by the neutralization of the acids of Examples I, II and IV with a primary amine. The types of amines suitable for this invention have been previously described in detail. In these examples a primary $C_{18}$–$C_{22}$ amine with a tertiary alkyl structure was used. This material is commercially available from Rohm and Haas under the trade name of Primene JMT. For the sake of brevity the letters JMT are used in the following examples to represent this amine.

EXAMPLE V

Bis(monochloromethyl)pyrophosphonic acid/Primene JMT amine salt

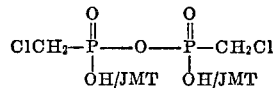

EXAMPLE VI

Bis(dichloromethyl)pyrophosphonic acid/Primene JMT amine salt

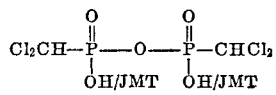

EXAMPLE VII

Tris(monochloromethyl)pyrophosphinic acid/Primene JMT amine salt

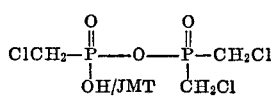

The pyrophosphonic and pyrophosphinic acid derivatives and the acid-amine salts of this invention can be added to mineral oil as well as synthetic lubricating oils, but are particularly useful in synthetic oils which are used under more extreme conditions where the advantages of these compounds are more pronounced. Synthetic lubricants suitable for the invention are of various types, such as aliphatic esters, silicones, polyalkylene oxides, polyphenyl ethers, fluorinated hydrocarbons, polyolefins, and phosphate esters. Examples of silicones include methyl silicone, methylphenyl silicone, methylchlorophenyl silicone, etc. Examples of polyalkylene oxides are polyisopropylene oxide, polyisopropylene oxide diether, and polyisopropylene oxide diester. Fluorinated hydrocarbons include fluorinated oils and perfluorinated hydrocarbons.

Preferred synthetic lubricant base stocks are esters of alcohols having 1 to 20, especially 4 to 12, carbon atoms and aliphatic carboxylic acids having from 3 to 20, especially 4 to 12, carbon atoms. The ester base may be a simple ester (reaction product of a monohydroxy alcohol and a monocarboxylic acid), a polyester (reaction product of an alcohol and an acid, one of which has more than one functional group), or a complex ester (reaction product of a polyfunctional acid with more than one alcohol, or of a polyfunctional alcohol with more than one acid). Also, excellent synthetic lubricants may be formulated from mixtures of esters, such as major proportions of complex esters and minor amounts of diesters.

Examples of suitable ester base oils are ethyl palmitate, ethyl laurate, butyl stearate, di-(2-ethylhexyl) sebacate, di-(2-ethylhexyl) azelate, ethyl glycol dilaurate, di-(2-ethylhexyl) phthalate, di-(1,3-methylbutyl) adipate, di-(1-ethylpropyl) azelate, diisopropyloxylate, dicyclohexyl sebacate, glycerol tri-n-heptoate, di(undecyl) azelate, and tetraethylene glycol di-(2-ethylene caproate), and mixtures thereof. An especially preferred mixture of esters consists of about 50 to 80% wt. bis(2,2,4-trimethylpentyl) azelate and 20 to 50% wt. 1,1,1-trimethylyl propane triheptanoate.

Especially preferred esters for use as base stocks in the present invention are esters of monocarboxylic acids having 3 to 12 carbons and polyalcohols, such as pentaerythritol, dipentaerythritol, and trimethylolpropane. Examples of these esters are pentaerythrityl butyrate, pentaerythrityl tetrabutyrate, pentaerythrityl tetravalerate, pentaerythrityl tetracaproate, pentaerythrityl dibutyratedicaproate, pentaerythrityl butyratecaproate divalerate, pentaerythrityl butyrate trivalerate, pentaerythrityl butyrate tricaproate, pentaerythrityl tributyratecaproate, mixed $C_{4-10}$ saturated fatty acid esters of pentaerythritol, dipentaerythrityl hexavalerate, dipentaerythrityl hexacaproate, dipentaerythrityl hexaheptoate, dipentaerythrityl hexacaprylate, dipentaerythrityl tributyratecaproate, dipentaerythrityl trivalerate trinonylate, dipentaerythrityl mixed hexaesters of $C_{4-10}$ fatty acids and trimethylolpropane heptylate. Pentaerythrityl esters of mixtures of $C_{4-12}$ acids are excellent base oils, and are commercially available from Hercules Chemical Company. Preparation of suitable esters is described in Eichemeyer, U.S. 3,038,859, issued June 12, 1962, and Young, U.S. 3,121,109, issued Feb. 11, 1964.

In addition to the aforementioned synthetic oils the additives of this invention may also be incorporated in mineral lubricating oils. The mineral lubricating oil can be obtained from paraffinic, naphthenic, asphaltic or mixed base crudes and/or mixtures thereof, for example neutral oil, oils having viscosities of from 100 to 6500 SSU at 100° F.

The pyrophosphonic or pyrophosphinic acids and their amine salts may be added either separately or in combination to the synthetic or mineral lubricating oils in the amount of from 0.01% to about 5% by weight.

Other additives can also be incorporated into the lubricating compositions according to the present invention. For example, any of the additives recognized in the art to perform a particular function or functions, i.e. viscosity index improvers such as methacrylic polymers; antioxidants, such as amines, phosphorus or phenolic compounds, i.e. phenyl-alpha-naphthylamine, dioctyldiphenyl amine; zinc dialkyl dithiophosphate, or 4,4′-methylene bis(2,6-di-t-butylphenol); anti-foam agents; corrosion inhibitors; anti-rust agents and the like can be used.

The remarkable effectiveness of the compounds of this invention in imparting improved load-carrying ability to lubricant compositions is demonstrated by the results shown in Table I. Blends of synthetic lubricant base stock, i.e. mixed $C_5$–$C_9$ pentaerythrityl ester, and the compounds of Examples III, VI and VII were prepared and their load-carrying capacities determined by the Ryder Gear Test conducted under the conditions outlined in military specification MIL–L–23699. The Ryder Gear Tester was developed by Pratt and Whitney in 1941 to evaluate lubricants of high speeds by observing the scuff on a pair of aircraft-quality gears to which a load is applied while the machine is in motion. Results are reported in terms of pounds per inch of tooth width. A complete description of this test is given in ASTM Bulletin No. 184, p. 41, September 1952. The concentration of the additives was adjusted so that each of the blends had an equivalent phosphorus content. The load-carrying capacity of the synthetic base stock without any additive was determined for comparative purposes.

TABLE I

| Additive | Concentration, wt. percent | Average rating, lb./in. |
|---|---|---|
| None | | 2,525 |
| Compound of— | | |
| Example III | 0.32 | 3,050 |
| Example VI | 0.11 | 2,970 |
| Example VII | 0.06 | 2,935 |

As previously mentioned, extreme-pressure additives suitable for use in synthetic gas-turbine lubricants must in addition to improving the load-carrying capacity of the base stock, also possess good oxidation stability properties and must not contribute to corrosion problems, or the formation of deposits. In order to evaluate the compounds of this invention in respect to these properties, a comparison was made between blends containing the monochloromethyl phosphonic acid/amine salt of the prior art and the preferred pyrophosphonic acid/amine salt of the present invention, i.e. bis(monochloromethyl)pyrophosphonic acid/Primene JMT. The composition of these blends are shown in Table II.

TABLE II

| Additives | Wt. percent | |
|---|---|---|
| | Composition A | Composition B |
| Monochloromethylphosphonic acid/JMT | *0.20 | |
| Bis(monochloromethyl)pyrophosphonic acid/JMT | | *0.12 |
| Phenyl-alpha-naphthylamine | 1.0 | 1.0 |
| Acryloid HF-844 (methacrylic polymer) | 0.25 | 0.25 |
| Benzotriazole | 0.05 | 0.05 |
| Bis-benzotriazole | 0.05 | 0.05 |
| p,p′-Dioctyldiphenylamine | 2.0 | 2.0 |
| Base stock (mixed $C_5$-$C_9$ pentaerythrityl ester) | Balance | Balance |

*Concentrations of the EP additives which provide compositions of equal phosphorus content.

Compositions A and B as described above were tested to determine their load-carrying capacity, their tendency to form deposits, and their corrosiveness to lead. The results of these tests are shown in Table III.

TABLE III

| | Ryder gear test, average rating, lb./in. | Eppi vapor-phase coker test, deposit weight net, g. | SOD lead corrosion, mg. | |
|---|---|---|---|---|
| | | | At 325° F., 1 hr. | At 375° F., 5 hr. |
| Composition: | | | | |
| A | 3,460 | 0.6998 | +5.9 | −0.22 |
| B | 4,110 | 0.6377 | −0.02 | +0.08 |

*Eppi Vapor-Phase Coker Test*—This test is used to predict the amount of vapor phase coking, i.e. carbon deposits found in bearing cavities or breather tubes of gas-turbine engines, that would occur in an engine test.

*SOD Lead Corrosion Test*—This test indicates corrosivity towards lead and is described in Fed. Test Method Std. No. 791a Method 5321.1. Specified limits at both 325° F. and 375° F. are ±6.0 mg.

In order to determine their corrosion and oxidation stability, Compositions A and B were tested in accordance with Pratt and Whitney Aircraft 521B specification at 425° F. for 48 hours. The results of these tests and the specification limits are shown in Table IV.

TABLE IV.—CORROSION AND OXIDATION TEST RESULTS

| | Specified limits | Composition A | Composition B |
|---|---|---|---|
| Magnesium, mg./cm.$^2$ | ±3.0 | −0.13 | 0.00 |
| Aluminum, mg./cm.$^2$ | ±3.0 | +0.01 | −0.01 |
| Copper, mg./cm.$^2$ | ±3.0 | −0.26 | −0.26 |
| Iron, mg./cm.$^2$ | ±3.0 | +0.03 | −0.01 |
| Silver, mg./cm.$^2$ | ±3.0 | +0.04 | 0.00 |
| Titanium, mg./cm.$^2$ | ±3.0 | +0.01 | −0.01 |
| Change in acid number | | 1.40 | 0.8 |
| Change in viscosity (100° F.), percent | [1] 50.0 | 26.4 | 25.8 |

[1] Max.

The two compositions were also subjected to the Alcor Deposition Test which gives a further measure of the stability of the lubricants in respect to deposit formation. A detailed description of this test is given in "Proceedings of the USAF-Southeast Research Institute Turbine Lubrication Conference," Sept. 13–15, 1966, Southwest Research Institute, San Antonio, Texas, pg. 152. The results of this test are summarized in Table V.

TABLE V.—ALCOR DEPOSITION TEST

| | Composition A | Composition B |
|---|---|---|
| Critical temperature, °F | 600 | 595 |
| Tube deposition rating (CRC scale) | 24.4 | 27.8 |
| Tube deposits, mg | 11.0 | 10.4 |
| Filter deposits, mg | 39.0 | 7.6 |
| Overall rating | 37.2 | 22.9 |
| Oil consumption, ml | 150 | 110 |
| Viscosity, 100° F, cs. after— | | |
| 0 hr | 29.9 | 27.6 |
| 24 hr | 34.0 | 31.5 |
| 48 hr | 36.9 | 34.4 |
| Viscosity change, 100° F., 48 hr., percent | +23.3 | +25.9 |
| Acid number after— | | |
| 0 hr | 0.25 | 0.13 |
| 24 hr | 0.36 | 0.17 |
| 48 hr | 0.42 | 0.26 |
| Acid number change, 48 hr | 0.17 | +0.13 |

The data presented in Table III indicate that Composition B containing one of the novel pyrophosphonic acid derivatives of this invention not only has greatly improved load-carrying ability but also has good stability and is less corrosive to lead. The results shown in Table IV indicate that Composition B is slightly less corrosive to the metals tested than is Composition A and also exhibits less of an acid number change. As shown in Table V, Composition B produces a lower overall deposit rating than Composition A indicating the pyrophosphonic acid/amine salt provides greater stability than the monochloromethyl phosphonic acid/amine of the prior art.

The novel compounds of the present invention therefore represent a class of additives which not only impart good load-carrying capacity to lubricant compositions, but also provide stable compositions with good antioxidation and anti-corrosion properties.

We claim as our invention:

1. An amine salt of the compound of the formula

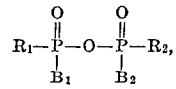

wherein $R_1$ and $R_2$ are monochloromethyl and $B_1$ and $B_2$ are OH, in which the amine is a primary tertiary-alkyl amine having 8 to 30 carbon atoms.

2. The amine salt of claim 1 in which the amine is a $C_{18}$–$C_{22}$ amine.

References Cited

UNITED STATES PATENTS

| | | | |
|---|---|---|---|
| 3,600,435 | 8/1971 | Randall et al. | 260—502.4 P |
| 2,858,332 | 10/1958 | Watson et al. | 260—501.21 |
| 2,063,629 | 12/1936 | Salzberg et al. | 260—545 P |
| 2,877,629 | 4/1957 | Coover et al. | 260—545 P |
| 2,882,308 | 4/1959 | Kwistek | 260—502.4 P |
| 2,841,611 | 7/1958 | Bersworth | 260—545 P |

OTHER REFERENCES

Moedritzer: "J. Am. Chem. Soc.," Vol. 83 (1961), pp. 4381–4, Q01A5.

JOSEPH E. EVANS, Primary Examiner

U.S. Cl. X.R.

252—32.5, 49.9; 260—247, 501.19, 502.4 P, 545 P